May 23, 1950
L. W. A. MEYER
2,508,414
METHOD OF FORMING PELLETS OF
THERMOPLASTIC MATERIALS
Filed Sept. 10, 1946
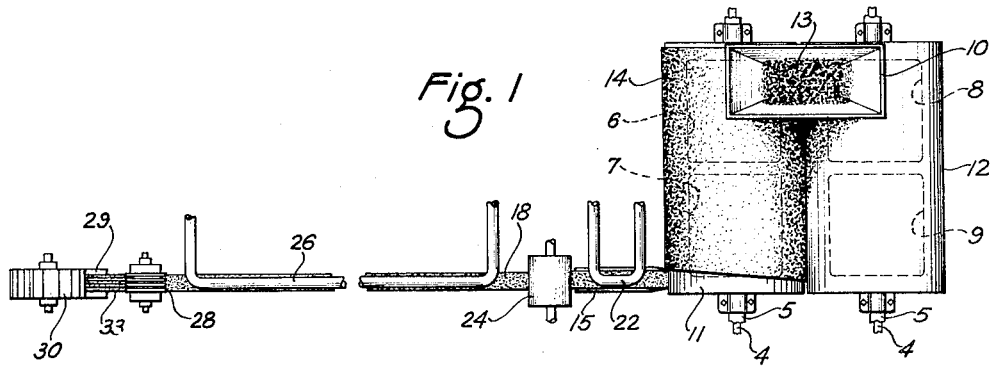
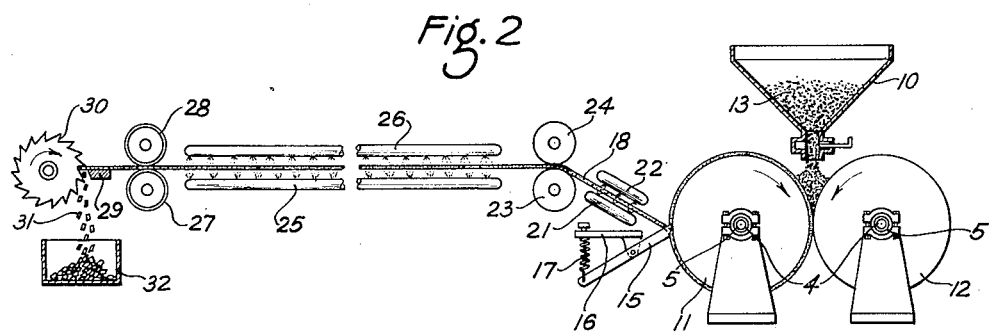
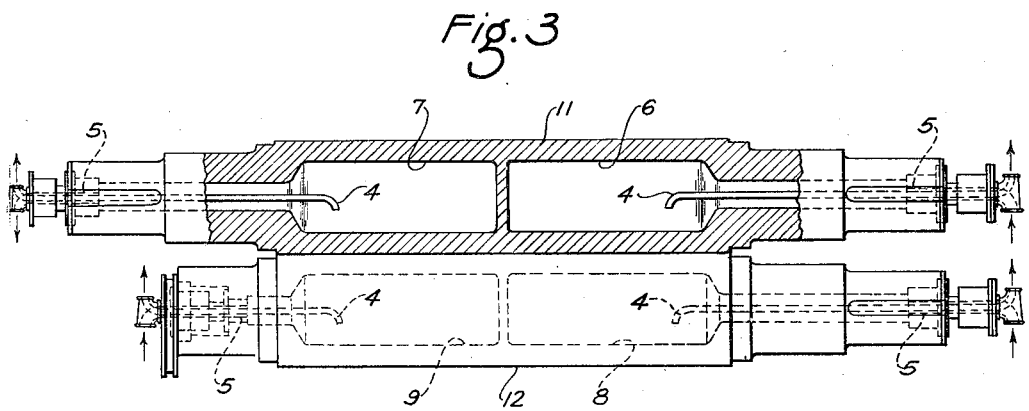
Lester W. A. Meyer
INVENTOR
BY
ATTORNEYS Patented May 23, 1950

2,508,414

UNITED STATES PATENT OFFICE 2,508,414

METHOD OF FORMING PELLETS OF THERMOPLASTIC MATERIALS

Lester W. A. Meyer, Kingsport, Tenn., assignor to Eastman Kodak Company, Rochester, N. Y., a corporation of New Jersey Application September 10, 1946, Serial No. 695,936

12 Claims. (Cl. 18—47.5)

1

This invention relates to the manufacture of plastic products and more particularly to an improved continuous process for making colloidized organic thermoplastic materials in the form of uniformly sized pellets, which are suitable for use in injection molding processes, from thermoplastic resins and cellulose organic acid derivative compositions, especially those containing cellulose acetate and cellulose acetate butyrate.

In U. S. Patents 2,048,686 of July 28, 1936, and 2,155,303 of April 18, 1939, methods are described for making colloidized thermoplastic materials suitable, when granulated, for use in injection molding processes. In these processes, the mixture of finely divided cellulosic material and plasticizer are rolled on hot rolls to colloidize these components. The rolling action intimately mixes the plasticizer and cellulose base material and exerts a shearing force thereon which tends to subdivide the hot colloidized material and to produce a homogeneous, uniform composition. At the end of the rolling treatment, the composition is collected on one roll in a layer. It is then manually cut off the roll and if the composition is to be employed in injection molding, the layer is broken up and fed to a granulator and thus subdivided into small granules. Granules of approximately uniform size are then selected as by screening, for injection molding uses, the finer or coarser granules being discarded as scrap.

The granulating operation thus produces coarse or fine materials which cannot be used to the best advantage in injection molding machines and a selecting operation, which further slows down and adds to the cost of granule production, is required. The necessity of removing fine or coarse pieces after the granulating operation, as well as the necessity for reworking the coarse and fine scrap stimulated the development of a continuous colloidizing and pelleting process by which only pellets of substantially uniform dimension and composition could be rapidly produced.

This continuous process is described and claimed in U. S. Patent 2,319,040 of May 11, 1943. As stated in that patent, pellets of uniform size and composition are produced by hot rolling finely divided particles of the organic base material of the plastic composition with plasticizer and, if desired, with fillers and/or coloring materials, on a pair of parallel positioned rolls, one of which at least is maintained at a temperature above that of the boiling point of water, and more particularly within a range of from 212° F. to 370° F. Preferably, the temperature of one roll is main-

2 tained higher than the other so that the composition will gradually collect on the hotter roll.

By continuously adding a uniform amount of the mixture at one end of these relatively closely spaced rolls, which rotate in opposite directions, the resulting thermoplastic mass will work gradually around and along the rolls, during which it will become thoroughly colloidized and collect on the hotter roll from which a narrow relatively thin strip of the colloidized plastic mass can be continuously removed adjacent the end of the roll remote from the feed end. This narrow, thin strip is positively cooled somewhat and is sliced lengthwise and is then cross cut while still in a heat softened state, into very short uniform lengths thereby producing pellets of the plastic composition of substantially uniform dimensions. Because the strip is relatively soft and pliable while being cut, substantially all of the composition is made into pellets which are well adapted for use in injection molding processes. The hot cutting eliminates "fines" normally produced when cold colloidized plastic materials are granulated by methods formerly employed in this industry and the predetermined setting of the slicing and cross cutting devices regulates the size of the pellets.

This process has been very successful in continuously producing thermoplastic pellets from a great variety of compositions. Recently, however, there have been developed several new plastic compositions which give considerable difficulty when colloidized by the above described continuous pelleting process. This difficulty arises from the fact that when the rolls are operated hot enough to secure the required colloidization, these particular plastic compositions adhere to the rolls and cannot be continuously stripped therefrom. It, therefore, appeared that the most practical manner of making pellets from these newer compositions was to employ the former batch process and strip the composition from the rolls by hand in accordance with the old more expensive practice.

An object, therefore, of the present invention is a continuous process for the production of pellets of uniform size from organic thermoplastic materials which are very tacky at temperatures required for colloidizing those plastic materials.

Another object of the invention is an improvement of the process described in U. S. Patent 2,319,040 whereby plastic compositions, which are extremely tacky at temperatures required for colloidizing the composition, may be continuously colloidized and continuously removed in a strip from the milling rolls without difficulty.

Still another object is a colloidizing process by which the temperature of the colloidizing operation may be more suitably regulated to the requirements of the plastic being colloidized.

In accordance with one feature of the present invention, these and other objects are attained by employing the general process of Patent 2,319,040, but employing the added step of differentially controlling the temperature along the length of, at least, the front roll from which the strip of colloidized plastic is removed. Adjacent the place at which the uncolloidized material is added to the rolls, the front roll temperature is maintained high to permit colloidization of the plastic mixture. As the colloidized material progresses around and along the front roll toward the end at which the colloidized homogeneously mixed plastic composition is taken off in a strip, the temperature of the roll is lowered so as to cool the plastic below the temperature at which it will tend to disadvantageously adhere to the front or back rolls. Thus when it reaches the point where it is continuously removed, the plastic strip, although still quite hot, will continuously leave the front rolls in a substantially non-sticking form. In the simplest form of operation, the second or back roll is maintained along its length below the temperature at which the plastic adheres disadvantageously to the rolls and consequently the mix will not collect thereon.

In accordance with another feature of the invention, both of the coacting rolls may be operated while their temperatures are differentially controlled. Thus the temperatures of both rolls at sections adjacent the end at which the uncolloidized plastic mix is added may be maintained above the colloidizing temperature of the plastic mix and sections adjacent the ends where the strip is continuously removed may be maintained below the temperature at which the colloidized plastic will resist being removed from the rolls in a continuous strip. For colloidizing some compositions it may be desirable to maintain each roll section at different temperatures. In general operation, the roll from which the strip is removed will be somewhat hotter than the other roll.

In accordance with still another feature of the invention, the thermoplastic mixture may be continuously added at approximately the mid section of the coacting rolls and permitted to work between the rolls and around the front hotter roll toward the opposite ends of the front roll, a strip of the colloidized plastic being removed from each end of the front roll. Under such operating conditions, the center section of at least the front roll would be heated to or above the colloidizing temperature of the plastic mix being colloidized and the opposite end sections of the front roll would be maintained relatively cooler to permit the removal of the pair of colloidized strips. The temperature of the coacting back roll could be similarly regulated having a high temperature section at its center portion and cooler sections at its ends. As previously mentioned, the temperatures of the back roll should be relatively lower than the corresponding sections of the front roll so that the composition being rolled will tend to accumulate on the hotter front roll.

In accordance with another feature of the invention, the thermoplastic mixture may be added simultaneously at the opposite end sections of the coacting rolls and worked between the rolls and around the front roll toward the mid section of the rolls where a strip of the colloidized plastic may be continuously removed from the front roll. In this arrangement, the opposite end sections of at least the front roll would be heated to or above the colloidizing temperature of the plastic mix being colloidized and the center section of the front roll would be maintained relatively cooler to permit the continuous removal of a strip of colloidized material. The temperature of the coacting back roll could be similarly regulated having high temperature sections at its ends and a lower temperature section at its middle portion. Again it is emphasized that the temperatures of the back roll shoud be relatively lower than the corresponding sections of the front roll to assure that the composition will accumulate on the front roll to facilitate its removal in a strip.

While it is desirable in many instances to employ a back roll having provisions for separately regulating the temperature along its length, in some cases satisfactory operation is attained by employing a back roll maintained at a substantially uniform temperature. Thus, a back roll having a single temperature control may be employed or one may be employed having a plurality of temperature controlled sections which in the particular operation are maintained at the same temperature.

The temperature of the rolls may be maintained by employing any suitable heating and cooling devices. I prefer to employ hollow rolls, each having a plurality of separate unconnected compartments into each of which heating and cooling fluids may be introduced as required by the conditions of operation. Generally, the colloidizing temperature will be above 212° F. and in a range of 212° F. to 370° F. Preferably the roll from which the plastic is removed in a strip is maintained from 20° F. to 100° F. or more higher than the temperature of the other roll so that the composition will gradually collect thereon.

By continuously adding a uniform amount of the mixture at one end of the pair of relatively closely spaced rolls which rotate in opposite directions, the resulting thermoplastic mass will work gradually around and along the rolls, during which it will become thoroughly colloidized by contact with the higher heated sections of the rolls, and subsequently cooled below its tacky point by contact with the cooler sections of the rolls. A narrow relatively thin strip of the colloidized plastic mass can be continuously removed from the cooled end section of the front roll. If desired, this narrow strip may be further cooled somewhat after it leaves the rolls, but it is cut lengthwise and then crosswise while it is still in a soft state into very short lengths, thereby producing pellets of substantially uniform dimensions. Because the strip is relatively soft while being cut, substantially all of the composition is made into usable pellets without any "fines."

The invention will be further understood by reference to the following detailed description and drawings in which:

Fig. 1 is a diagrammatic plan view of the preferred apparatus for use in carrying out the process of the invention;

Fig. 2 is a diagrammatic elevational view of the apparatus shown in Fig. 1; and

Fig. 3 is a view of the pair of double chambered rolls showing the fluid inlet and outlet system by which the temperature in any one chamber can be maintained the same or different than the temperature in the other chambers.

The present invention is described with particular reference to cellulose acetate butyrate plastics, but the process is equally applicable to the continuous production of improved plastic products from any of the various cellulose organic derivatives, such as cellulose acetate, cellulose propionate, cellulose butyrate, cellulose acetate propionate, methyl cellulose, ethyl cellulose, benzyl cellulose, as well as the thermoplastic resins such as acetal resins and others known to the art.

The initial step in preparing molding compositions from these derivatives is the mixing of an appropriate amount of the finely divided base material of the composition with a compatible plasticizer and any other material such as dyes, pigments, pearl essence or other nacreous materials, fillers and the like which may be desired. While various types of mixers may be employed, one may use the type of mixer and, if applicable, the method described in U. S. Patent 2,150,939 of March 21, 1939.

Referring to Figs. 1 and 2 of the instant application, there is shown apparatus comprising a hopper 10, adapted to contain an uncolloidized plastic mixture 13, positioned above a pair of rolls 11 and 12 which are adapted to rotate in opposite directions. If desired, a plate or other suitable mechanical device not shown can be associated with the ends of the rolls adjacent the hopper to retain the mixture on the rolls. Roll 11 has two hollow chambers 6 and 7 therein and roll 12 has two hollow chambers 8 and 9 therein which are associated as shown more clearly in Fig. 3 with fluid inlet conduits 5 and fluid outlet conduits 4 which are respectively connected to a source of fluid and a return as will be understood. Steam, hot and cold water may be advantageously employed to provide the desired temperatures in all or any of the chambers. In accordance with an important feature of this invention, the effective surface temperatures of the rolls along their length can be differentially regulated by introducing fluids at different temperatures into the respective chambers. The end sections of the rolls beneath the hopper which come into first contact with the uncolloidized plastic mixture continuously flowing from the hopper 10 may be maintained at approximately the colloidizing temperature of the mixture by introducing hot fluids into chambers 6 and 8 and the opposite end sections of the rolls may be maintained relatively cooler by introducing cooler fluids into chambers 7 and 9 so as to reduce or eliminate the tackiness of the colloidized plastic 14 and permit it to be continuously removed in a strip 18 by stripper knife 15 which is mounted on support 16 and held against roll 11 by spring 17.

A pair of air jets 21 and 22 are positioned near the roll 11 for cooling the strip 18, and draw off rolls 23 and 24 pull the strip 18 from the roll 11 and between air jets 21 and 22. Longitudinal slicing rolls 27 and 28 draw the strip 18 through a second set of cooling air jets 25 and 26 and slice the strip 18 into a plurality of narrow strips 33. These rolls are so positioned that the cutting members of the respective rolls will slightly enter and rotate in the grooves of the opposite roll, leaving, however, a space for the slit material to pass. These strips 33 are then conducted across platen 29 to engage the rotary cutter 30 which operates continuously to cut the soft narrow strips into uniform lengths thereby forming pellets 31 of predetermined dimensions which are collected in bin 32.

If desired, bin 32 may be suitably cooled, by means not shown, to bring the temperature of the pellets quickly down to room temperature. If the pellets of some materials tend to adhere into clusters in the bin, they may be caused to slide over a cooled chute to lower their temperature before they pile up in the bin.

The various rolls and the rotary slicing and cutting devices of the apparatus shown in the drawings are mounted to rotate and may be caused to rotate by suitable mechanisms not shown. If desired, rolls 11 and 12 may both be driven at the same or different rates. If differentially driven, the front roll 11 would generally be driven at the faster speed. The rolls 11 and 12 are also mounted on means not shown so that the space between the rolls can be adjusted to suit any particular conditions of operation. By suitable adjustment of this space, the thickness of the pellet can be determined. In general, the pellet size is from $\frac{1}{16}$ to $\frac{1}{8}$ inch square, although as above suggested pellets having other rectangular shapes may be produced by suitable adjustment of the rolls and the slicing and cutting devices.

Example I 100 parts cellulose acetate butyrate mixed with 15 parts methoxyethyl stearate are added to the hopper 10 and permitted to flow continuously onto the revolving rolls 11 and 12 at one end where it is worked therebetween. The temperature of the front roll 11 above chamber 6 was approximately 240° F. and above chamber 7 was approximately 215° F. The temperature of the back roll 12 above chamber 8 was approximately 220° F. and above chamber 9 was approximately 145° F. The front roll 11 being of a relatively higher temperature will pick up the plastic layer 14 a short distance away from the feed end of the rolls and it will work spirally around the roll to its opposite end. The thermoplastic composition owing to the heat and mixing action of the rolls becomes colloidized and homogeneously mixed. However, because the temperature of the section of the roll above chamber 7 is below the temperature at which the thermoplastic is extremely tacky, a narrow strip 18 can be continuously cut off the layer 14 by knife 15 and continuously conducted through the subsequent parts of the apparatus as heretofore explained. The amount of material leaving the rolls in strip 18 is equivalent to the amount of new material being continuously added on the input end of the rolls.

Example II

Pellets were continuously made in accordance with the above described process from a composition containing:

| | Parts |
|---|---|
| Cellulose acetate butyrate | 100 |
| Dibutyl sebacate | 13 |
| Phenyl salicylate | 1 |

The temperature of section of the front roll adjacent the feed hopper was maintained at 290° F. and the corresponding section of the back roll was maintained at 270° F. To prevent this compound from disadvantageously adhering to the rolls adjacent to the stripping knife, the temperature of the opposite section of the front roll was held at 280° F. and the back roll at 230° F. Without employing the double compartment rolls and such temperature control, it is impossible to produce continuously pellets from this material on this type of apparatus.

*Example III*

A mixture containing:

| | Parts |
|---|---|
| Cellulose acetate butyrate | 100 |
| Methoxyethyl stearate | 7.5 | was continuously added to the pelleting apparatus as described above. The heating section of the front roll adjacent the hopper was held at 350° F. to colloidize the mixture and the corresponding section of the back roll was held at 300° F. The cooling section of the front roll was held at 320° F. and that of the back roll at 230° F. Uniform sized pellets were produced under these conditions at a rapid rate without difficulty due to adhesion of the plastic to the roll.

*Example IV*

A mixture containing:

| | Parts |
|---|---|
| Cellulose acetate butyrate | 100 |
| Butyl stearate | 13.3 |
| Butyl sebacate | 20 | were processed in the pelleting apparatus. The roll temperatures most suitable for this plastic composition are: front roll colloidizing section 195° F., corresponding section on back roll 230° F., cooling section of front 215° F. and of back roll 145° F. Pellets of uniform size and of homogenous composition were continuously formed under these conditions.

The above examples describe typical adjustments of roll section temperatures for the production of pellets from thermoplastic compositions which cannot be rolled and cut into pellets without such temperature control. It has been found that in general the take off end of the front roll should be from 20 to 25 degrees cooler than the hopper end. The back roll should also have about the same temperature differential as the front roll and also should be at least 20 to 30 degrees cooler than the corresponding points of the front roll.

*Example V*

A continuous strip was made in accordance with the invention from a composition containing:

| | Parts |
|---|---|
| Cellulose acetate butyrate | 100 |
| Dibutyl phthalate | 20 |

The temperature of the section of the front roll beneath the feed hopper was maintained at 290° F. and the corresponding section of the back roll was maintained at 270° F. To prevent this compound from disadvantageously adhering to the rolls adjacent to the stripping knife, the temperature of the opposite section of the front roll was held at 280° F. and the back roll at 230° F. As the strip left the front roll, it was passed through the cooling devices 21 and 22 shown in Figs. 1 and 2 of the drawing and was further cooled by being wound in a spiral path around a large turning cold roll, not shown, from whence it was directed to a wind up roll, not shown, and wound into a roll. The material in strip form may be employed for various purposes. It may be cut into large sections and employed in compression molding operations or the strip may be calendered and trimmed for use in making woven chair seats and the like.

In some instances it may be desirable to remove multiple strips from the roll by employing a plurality of parallel mounted knives. These strips could then be rolled up for subsequent processing or be cut up into pellets.

The cellulose acetate butyrate employed in Examples 1 to 5 has a butyryl content of 37.5% and an acetyl content of 13%. However, cellulose acetate butyrates containing from 30 to 55% butyryl can be satisfactorily employed in thermoplastic compositions. Such cellulose mixed esters are described more fully in U. S. Patent 2,261,140 of November 4, 1941. Cellulose acetates containing from 36 to 42% acetyl are particularly adapted to colloidization in the presence of plasticizers by my invention. Such esters are described in U. S. Patent 1,826,693 of October 6, 1931.

While this process is particularly adaptable for the production of continuous strips or pellets of plastic compositions which are tacky at colloidizing temperatures, it also is adaptable and desirable for use to form strips and pellets from other compositions which are not particularly tacky at their colloidizing temperatures. In fact, a substantial reduction in process time has been noted when compositions such as those disclosed in Examples 1 to 11 of Patent 2,319,040 are made into pellets by the instant process. This appears due, in part, to the better temperature control obtained by employing colloidizing rolls having a plurality of temperature regulating means. It is, therefore, my intent to include those examples, by reference, in this application as typical of the compositions which can be advantageously processed in accordance with the instant invention.

To illustrate this process, Figs. 1 and 2 of the drawings have been made somewhat similar to Figs. 1 and 2 of Patent 2,319,040. It will be understood, however, the present invention is equally adaptable for use with the apparatus shown in Figs. 3, 4 and 5 of that patent, provided the colloidizing rolls are equipped with multiple chambers as herein described.

Furthermore, while the invention is illustrated with rolls having only two separate chambers in each roll, it is entirely in the purview of the invention to have more than two temperature chambers or other temperature controlling means in each roll to regulate the surface temperature of the rolls along their length.

It will also be understood that although emphasis has been made herein particularly to producing pellets for use in injection molding operations, that depending on their composition they may be employed for many other uses and there is no intent to limit the following claims as respects the use of the product.

I claim:

1. The continuous process of forming strips of colloidized organic thermoplastic compositions, which comprises continuously adding a colloidizable mixture of an organic thermoplastic compound and a plasticizer to a pair of parallel closely spaced milling rolls, continuously colloidizing the mixture to form a homogeneous thermoplastic composition by working it between opposing parallel sections of the respective rolls, one of which sections is heated to at least the colloidizing temperature of the mixture whereby the colloidized mixture moves progressively along and around the roll having the hotter section in the form of a continuous coherent blanket, continuously cooling the colloidized thermoplastic blanket between other cooler opposing sections of the rolls to a temperature at which it is more easily stripped from the roll, and continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal.

2. The continuous process of forming colloidized organic thermoplastic compositions into desired shapes, which comprises continuously adding a colloidizable mixture of an organic thermoplastic compound and a plasticizer to a pair of parallel closely spaced milling rolls, continuously colloidizing the mixture to form a homogeneous thermoplastic composition by working it between opposing parallel sections of the respective rolls, one of which sections is heated to at least the colloidizing temperature of the mixture whereby the colloidized mixture moves progressively along and around the roll having the hotter section in the form of a continuous coherent blanket, continuously cooling the colloidized thermoplastic blanket between other cooler opposing sections of the rolls to a temperature at which it is more easily stripped from the roll, continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal, at least partially cooling the strip and cutting the strip into relatively short lengths, pellets and the like.

3. The continuous process of forming strips of colloidized cellulose organic ester thermoplastic compositions, which comprises continuously adding a colloidizable mixture of the cellulose ester and plasticizer to a pair of parallel closely spaced milling rolls, continuously colloidizing the mixture to form a homogeneous thermoplastic composition by working it between opposing parallel sections of the respective rolls, one of which sections is heated to at least the colloidizing temperature of the mixture whereby the colloidized mixture moves progressively along and around the roll having the hotter section in the form of a continuous coherent blanket, continuously cooling the colloidized thermoplastic blanket between other cooler opposing sections of the rolls to a temperature at which it is more easily stripped from the roll, and continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal.

4. The continuous process of forming colloidized cellulose organic ester thermoplastic compositions into desired shapes which comprises continuously adding a colloidizable mixture of the cellulose ester and plasticizer to a pair of parallel closely spaced milling rolls, continuously colloidizing the mixture to form a homogeneous thermoplastic composition by working it between opposing parallel sections of the respective rolls, one of which sections is heated to at least the colloidizing temperature of the mixture whereby the colloidized mixture moves progressively along and around the roll having the hotter section in the form of a continuous coherent blanket, continuously cooling the colloidized thermoplastic blanket between other cooler opposing sections of the rolls to a temperature at which it is more easily stripped from the roll, continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal at least partially cooling the strip and cutting the strip into relatively short lengths, pellets and the like.

5. The process of claim 3 in which the cellulose organic ester is cellulose acetate.

6. The process of claim 3 in which the cellulose organic ester is cellulose propionate.

7. The process of claim 3 in which the cellulose organic ester is cellulose acetate butyrate.

8. The process of claim 4 in which the cellulose organic ester is cellulose acetate.

9. The process of claim 4 in which the cellulose organic ester is cellulose propionate.

10. The process of claim 4 in which the cellulose organic ester is cellulose acetate butyrate.

11. The continuous process of forming strips of colloidized organic thermoplastic compositions, which comprises continuously adding a colloidizable mixture of an organic thermoplastic compound and a plasticizer to a pair of parallel closely spaced milling rolls having a plurality of temperature controlled sections therein, continuously colloidizing the mixture to form a homogeneous thermoplastic composition by working it between two opposing parallel sections of the respective rolls, one of which sections is heated higher than the other and to at least the colloidizing temperature of the mixture whereby the colloidized mixture moves progressively along and around the roll having the hotter section in the form of a continuous coherent blanket, continuously cooling the colloidized blanket between two other cooler opposing sections of the rolls, one of which is heated higher than the other, to a temperature at which it is more easily stripped from the roll, said higher heated sections being in the same roll, and continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal.

12. The continuous process of forming colloidized organic thermoplastic compositions into desired shapes, which comprises continuously adding a colloidizable mixture of an organic thermoplastic compound and a plasticizer to a pair of parallel closely spaced milling rolls having a plurality of temperature controlled sections therein, continuously colloidizing the mixture to form a homogeneous thermoplastic composition by working it between opposing parallel sections of the respective rolls, one of which sections is heated higher than the other and to at least the colloidizing temperature of the mixture whereby the colloidized mixture moves progressively along and around the roll having the hotter section in the form of a continuous coherent blanket, continuously cooling the colloidized thermoplastic blanket between two other cooler opposing sections of the rolls, one of which is heated higher than the other, to a temperature at which it is more easily stripped from the roll, said higher heated sections being in the same roll, continuously removing a strip of the progressively moving coherent colloidized composition from said roll at a point remote from the point at which the material is added and colloidized but at or adjacent said cooled section of the roll to which the composition has adhered, the rate of addition of the material and its removal in the strip being substantially equal at least partially cooling the strip and cutting the strip into relatively short lengths, pellets and the like.

LESTER W. A. MEYER.

REFERENCES CITED

The following references are of record in the file of this patent:

UNITED STATES PATENTS

| Number | Name | Date |
|---|---|---|
| 644,810 | Sylvester | Mar. 6, 1900 |
| 2,075,735 | Loomis | Mar. 30, 1937 |
| 2,221,019 | Clarke | Nov. 12, 1940 |
| 2,319,040 | Conklin | May 11, 1943 |
| 2,327,627 | Esselen | Aug. 24, 1943 |
| 2,350,632 | Murphy et al. | June 6, 1944 |